Patented Feb. 23, 1943

2,311,713

UNITED STATES PATENT OFFICE 2,311,713

CATALYST AND PROCESS FOR THE PREPARATION THEREOF

Samuel Benson Thomas and Frank M. McMillan, Berkeley, Calif., assignors to Shell Development Company, San Francisco, Calif., a corporation of Delaware No Drawing. Application April 20, 1940, Serial No. 330,756

16 Claims. (Cl. 252—205)

The present invention relates to new and improved combination catalysts comprising anhydrous aluminum chloride and adsorptive promoting supports, and to a process for their preparation.

Aluminum chloride is an extremely active catalyst capable of catalyzing a wide variety of reactions. It is inexpensive and commercially available and finds considerable application in the alkylation of hydrocarbons with olefines, the cracking of hydrocarbons, the polymerization of unsaturated hydrocarbons, Friedel-Crafts reactions and the like. In most of these reactions the aluminum chloride is customarily employed per se. In a few cases, especially when executing the reaction in the vapor phase, the aluminum chloride is employed in combination with carrier or supporting materials, such as pumice, charcoal, and the like to prevent the aluminum chloride from agglomerating to a hard or sticky mass and to produce a catalyst having a fixed physical shape better adapted for use in vapor phase operations. These supported catalysts are usually prepared by simply mixing pieces of carrier material with powdered anhydrous aluminum chloride whereupon the surface of the carrier material becomes coated. Another method for producing supported aluminum chloride catalysts which has the advantage of allowing the aluminum chloride content to be applied in higher concentrations is to press or pill suitable mixtures containing the desired proportion of aluminum chloride and powdered carriers. The supported aluminum chloride catalysts hitherto employed are superior to aluminum chloride per se in that they are less prone to sludge and are more suitable for use in vapor phase reactions; in certain cases they are also somewhat more active, due to an increased available catalytic surface. In most respects, however, they do not differ materially from aluminum chloride per se. Thus, they are usually of about the same order of activity, and exhibit very little selectivity in their action.

It has been found that by combining aluminum chloride with certain types of carrier materials, the catalytic action and selectivity may be materially enhanced. This, it has been found, is due primarily to a specific promoting action. One material, for instance, which is outstanding in its activity to promote the catalytic activity and selectivity of aluminum chloride is a particular adsorptive alumina, known and sold in the trade as "activated alumina"; thus, the catalytic properties of aluminum chloride are materially improved even by mechanically mixing with powdered "activated alumina." Superior catalysts comprising anhydrous aluminum chloride and "activated alumina" are described and claimed in copending application, Serial No. 292,295, filed August 28, 1939. Many carrier materials possessing the ability to promote the catalytic activity of aluminum chloride to a lesser extent than "activated alumina" and the improvement obtained by simple mechanical mixing is with those materials often too small to be noticed. It has been found, however, that if the aluminum chloride is combined with these various carrier materials in an entirely different way, the promoting action is much more pronounced. Thus, in copending application, Serial No. 290,256, filed August 15, 1939, there is described the preparation of promoted catalysts by fusing together a suitable carrier material and sufficient aluminum chloride under pressure to produce a solid cake upon cooling. The fused mass is made to expand by decreasing the pressure just before the melt solidifies, and the porous solid cake obtained is crushed and graded to produce the catalyst. By combining the aluminum chloride and carrier material in this manner the promoting action is enhanced so that a distinct promotion may be realized with certain less active carrier materials which, by the older methods of combining, appeared to be entirely inert.

It was also found that the promoting action of these carrier materials could be still further enhanced and superior catalysts prepared by combining the aluminum chloride and carrier in a somewhat different way. Thus, it was found that if, instead of forming a solid cake as above described, the carrier material is removed from the melt and the excess aluminum chloride carefully drained under pressure, much superior catalysts result. This method of catalyst preparation is described in copending application, Serial No. 296,898 filed September 28, 1939 which matured into United States Patent No. 2,295,977 on September 15, 1942. The improvement in this method of preparation over that described immediately above is due to the fact that the aluminum chloride in this case is not thickly coated on the carrier, but is uniformly supported upon the surface of the promoting carrier material in a thin layer. Thus, a catalyst prepared in the former way with a given carrier material may contain, for instance, 60% $AlCl_3$, whereas a catalyst prepared according to the latter method with the same carrier may contain, for instance, only about 35% $AlCl_3$ deposited in a thinner, more uniform film in more intimate contact with the promoting carrier.

We have found that for catalysts prepared from aluminum chloride and any particular active carrier material there is an optimum proportion of aluminum chloride, and that much superior catalysts having the optimum amount of aluminum chloride may be prepared in a most convenient and practical manner by impregnating suitable active carrier materials with aluminum chloride vapors.

The amount of aluminum chloride to be applied to any given carrier material to realize the maximum promoting effect, we have found, depends upon the amount of available surface in the carrier and varies in general between about 8 and 28%. Thus, a material such as silica gel which has an enormous inner surface ($2.5 \times 10^6$ cm$^2$/gm) may require as much as about 28% of aluminum chloride, whereas certain adsorptive clays may require as low as about 8% of aluminum chloride. The majority of active carrier materials, however, give optimum results when the amount of aluminum chloride is between these extremes. Thus, in the case of "activated alumina" carrier, for example, the best catalysts contain between about 15 and 25% and preferably between about 17 and 23% of aluminum chloride.

The present improved catalysts may be prepared most conveniently by providing a bed of the desired adsorptive carrier material and passing vapors of aluminum chloride therethrough under controlled conditions. While the process may be applied with any adsorptive carrier, the most selective and best catalysts are prepared from aluminous and/or siliceous adsorptive carrier materials of natural or synthetic origin which contain a small amount of firmly-bound water. Suitable materials of this category are, for example, the activated materials obtained from certain natural-occurring minerals and clays, such as bauxite, dawsonite, gibbsite, Florida earth, bentonite, kaolin, pipe clay, meerschaum, montmorillonite, the zeolites, diatomaceous earth, kieselguhr, infusorial earth, and the like; the various treated clay and clay-like materials such as "Terrana," "tonsil," "celite," "silo-cel," and the like; and artifically prepared materials such as activated permutites and the like. Particularly effective carrier materials are the adsorptive aluminas characterized by possessing the surface structure and characteristics of the "activated alumina" of commerce. "Activated alumina" is a well known and readily available adsorptive alumina widely used for the adsorption of gases and vapors from gas mixtures. It is specially prepared, hard, stoney, crystalline, non-friable, highly adsorptive, partially hydrated form of alumina discovered about ten years ago and designated "activated alumina" because of its active adsorptive properties. The term "activated alumina" as used throughout the specification and claims is used to designate this material prepared as described in U. S. Patent No. 1,868,869. Other especially advantageous carrier materials include "Porocel" and "Terrana." The above applicable active carrier materials are preferably partially dehydrated by heating in a dry atmosphere at a temperature of about 200 to 400° C. until they substantially cease to give off water. While we do not desire our invention to be limited to the soundness or accuracy of any theories advanced to explain the advantageous results, it appears that the promoting action of these carrier materials is somehow connected with their firmly-bound water. This may be due to the water molecules themselves, but is more likely due to a particular condition of the promoting surface. In such cases where the desired carrier material is finely divided it may be first pressed into suitably shaped pills, if desired with a binding agent prior to being impregnated.

In order to produce the most active and selective catalysts with the above adsorptive carrier materials the amount of aluminum chloride impregnated therein should be regulated so as to be between about 8 and 28%. This may be conveniently done when the impregnation is effected in the vapor phase by controlling the time and conditions of the impregnation. One or two laboratory tests will usually suffice to indicate just where within this narrow range the optimum aluminum chloride concentration for the particular adsorptive carrier material lies.

The impregnation is preferably executed at a temperature from the boiling point of aluminum chloride (about 183° C.) up to about 300° C. In some cases somewhat higher temperatures may be employed, but the catalyst produced with most carriers at temperatures above about 300° C. are usually much inferior to those prepared at somewhat lower temperatures. In general, the lower the impregnation temperature the higher is the concentration of impregnated aluminum chloride. A very satisfactory temperature range for most catalyst preparations is between about 200° C. and 280° C. The impregnation may, if desired, be executed under elevated or reduced pressures; we have found, however, that pressure has little influence on the properties of the catalysts and that entirely satisfactory catalysts may be prepared with most of the active carrier materials at atmospheric pressure. A method and apparatus particularly adapted for the catalyst preparation are described in copending application Serial No. 329,698 filed April 15, 1940.

The following examples illustrate the preparation of our improved catalysts.

*Example I*

A quantity of "activated alumina" previously dried at 300° C. and containing about 7% of firmly-bound water was placed in a quartz tube and maintained at a temperature of about 225° C. Aluminum chloride was sublimed at atmospheric pressure and the vapors passed through the bed of alumina for a total time of about 20 minutes. The prepared catalyst contained about 14% of aluminum chloride.

*Example II*

A quantity of "activated alumina" previously dried at 300° C. and containing about 7% of firmly-bound water was placed in a steel tube and maintained at a temperature between 225° C. and 240° C. Aluminum chloride was sublimed at atmospheric pressure and the vapors passed through the bed of alumina for a total time of about 145 minutes. The prepared catalyst contained about 19% of aluminum chloride.

*Example III*

A quantity of 6 to 8 mesh "activated alumina" previously dried at 300° C. and containing about 7% of firmly-bound water was suspended in a basket in a steel bomb above a quantity of aluminum chloride. The bomb was closed, heated to 225° C. for about 3 hours, and finally cooled. The "activated alumina" was found to have adsorbed 21% by weight of aluminum chloride (as determined by titration). This is nearly the optimum concentration. If the "activated alumina" is allowed to contact the molten aluminum chloride on the other hand, the concentration of aluminum chloride is much greater.

*Example IV*

A quantity of 6 to 8 mesh "celite" grade C-3 previously dried at 190° C. was impregnated with aluminum chloride vapors at 220° C. and atmospheric pressure for about 110 minutes. The catalyst contained 8.3% aluminum chloride.

*Example V*

A quantity of 6 to 8 mesh "activated alumina" previously dried at 300° C. and containing about 7% of firmly-bound water was placed in a steel tube. Aluminum chloride was sublimed and the vapors passed through the bed of alumina under a pressure of 180 mm. of mercury and at a temperature of 160 to 180° C. The prepared catalyst contained about 16.5% of aluminum chloride.

*Example VI*

A quantity of an adsorptive silica-alumina carrier material containing about 6.2% $SiO_2$ (on the dry basis) and 8.5% of firmly-bound water was impregnated with aluminum chloride vapors in a steel tube at atmospheric pressure. The temperature and time of impregnation were 265° C. and 30 min. respectively. The catalyst contained about 15% of aluminum chloride.

*Example VII*

A quantity of silica gel was impregnated with aluminum chloride vapors in a steel tube at atmospheric pressure. The temperature and time of impregnation were 240° C. and 35 min. respectively. The catalyst contained about 29% of aluminum chloride.

*Example VIII*

A quantity of $\frac{3}{32}$ inch pressed pills of "activated alumina" was placed in a steel tube and aluminum chloride vapors were passed therethrough under atmospheric pressure and at a temperature of 245° C. for 65 min. The catalyst contained about 13% of aluminum chloride.

*Example IX*

A quantity of an activated aluminum silicate having about 3% of firmly-bound water was placed in a steel tube and aluminum chloride vapors were passed therethrough under atmospheric pressure and at a temperature of about 225° C. for about 40 min. The catalyst prepared contained about 8% of aluminum chloride.

*Example X*

A quantity of a 6 to 8 mesh "porocel" containing about 6.8% of firmly-bound water was placed in a steel tube and aluminum chloride vapors were passed therethrough under atmospheric pressure and at a temperature of about 250° C. The catalyst contained about 23% of aluminum chloride.

The catalysts of the present invention are particularly advantageous in several respects. They exhibit very high and exceptionally selective activity. Furthermore, they retain their activities particularly well, thus decreasing considerably the expense, inconvenience and loss of conversion attended by renewing and regenerating the catalyst. Furthermore, they retain the aluminum chloride much better than any other aluminum chloride catalysts known, consequently no difficulties are encountered due to the plugging of lines, etc., due to the volatilization of aluminum chloride from the catalyst and its subsequent deposition in various cooler parts of the plant. Furthermore, they are much less expensive to prepare; they do not require the use of high pressure apparatus and baths of molten aluminum chloride. Furthermore, they may be easily prepared with excellent uniformity; in the older method of preparation, considerable difficulty in producing uniform catalysts is encountered due to the change in the viscosity of the molten aluminum chloride with use and with small variations in temperature. Furthermore, they may be easily prepared exceptionally free of contaminating impurities which may materially harm the selectivity; commercial aluminum chloride always contains a certain amount of iron chloride and quickly acquires further amounts when handled in the molten state in apparatus fabricated from ferrous metals; the catalysts prepared by the former methods, therefore, usually contain appreciable quantities of iron and other chlorides.

The present catalysts due to their very reasonable cost, ease of preparation and handling, and exceptional catalytic properties are eminently suited for a wide variety of uses, particularly in vapor phase processes. One application for which they are especially adapted is in the isomerization of saturated hydrocarbons. The following examples illustrate the exceptional activity, selectivity and stability of catalyst prepared according to the present method in the vapor phase isomerization of butane.

*Example XI*

An "activated alumina" catalyst impregnated with aluminum chloride vapors under pressure and containing about 23.5% aluminum chloride was employed in the vapor phase isomerization of normal butane at a temperature of 100° C., pressure of 11 atmospheres, space velocity of 6 mols per liter catalyst per hour and in the presence of 2 mol percent of hydrogen chloride. The initial conversion to isobutane was about 66% and very little side reaction took place. The activity of the catalyst moreover, was retained remarkably well; thus, after 423 hours of continuous operation the conversion was still about 39 to 40%.

*Example XII*

An "activated alumina" catalyst impregnated with aluminum chloride vapors at atmospheric pressure and containing about 18.3% $AlCl_3$ was employed in the vapor phase isomerization of normal butane at a temperature of about 100° C., pressure of about 11 atmospheres, space velocity of 6 mols per liter catalyst per hour and in the presence of 2 mol percent of hydrogen chloride. The initial conversion to normal butane was about 65%. After 373 hours of continuous operation the conversion to isobutane was still above 45% with only about 1% of side reactions.

We claim as our invention:

1. A process for the production of improved combination aluminum chloride catalysts comprising the steps of providing a bed of "activated alumina" and passing vapors of anhydrous aluminum chloride therethrough under conditions whereby the "activated alumina" becomes impregnated with from 8 to 28% of aluminum chloride, the "activated alumina" and the aluminum chloride being maintained above the aluminum chloride vaporization point during the impregnation step.

2. A process for the production of improved combination aluminum chloride catalysts comprising the steps of providing a bed of an adsorptive alumina having the characteristic surface properties of the "activated alumina" of commerce and passing vapors of anhydrous aluminum chloride therethrough under conditions whereby the alumina becomes impregnated with from 8 to 28% of aluminum chloride, said aluminum chloride vapors and the adsorptive alumina being maintained above the aluminum chloride vaporization point during said impregnation step.

3. A process for the production of improved combination aluminum chloride catalysts comprising the steps of providing a bed of an adsorptive aluminous catalyst carrier and passing vapors of anhydrous aluminum chloride therethrough under conditions whereby the adsorptive carrier becomes impregnated with from 8 to 28% of aluminum chloride, said aluminum chloride vapors and the carrier being maintained above the aluminum chloride vaporization point during said impregnation step.

4. A process for the production of improved combination aluminum chloride catalysts comprising the steps of providing a bed of pilled "Terrana" and passing vapors of anhydrous aluminum chloride therethrough under conditions whereby the pilled "Terrana" becomes impregnated with from 8 to 28% of aluminum chloride, said aluminum chloride vapors and the "Terrana" being maintained above the aluminum chloride vaporization point during said adsorption step.

5. A process for the production of improved combination aluminum chloride catalysts comprising the steps of providing a bed of pilled adsorptive clay and passing vapors of anhydrous aluminum chloride therethrough under conditions whereby the pilled adsorptive clay becomes impregnated with from 8 to 28% of aluminum chloride, said aluminum chloride vapors and the clay being maintained above the aluminum chloride vaporization point during said impregnation step.

6. A process for the production of improved combination aluminum chloride catalysts comprising the steps of providing a bed of adsorptive carbon and passing vapors of anhydrous aluminum chloride therethrough under conditions whereby the adsorptive carbon becomes impregnated with from 8 to 28% of aluminum chloride, said aluminum chloride vapors and the adsorptive carbon being maintained above the aluminum chloride vaporization point during said impregnation step.

7. A process for the production of improved combination aluminum chloride catalysts comprising the steps of providing a bed of adsorptive catalysts carrier material and passing vapors of anhydrous aluminum chloride therethrough under conditions whereby the adsorptive carrier becomes impregnated with from 8 to 28% of aluminum chloride, said aluminum chloride vapors and the carrier material being maintained above the aluminum chloride vaporization point during said adsorption step.

8. A process for the production of improved combination aluminum chloride catalysts comprising the steps of providing a bed of adsorptive alumina having the characteristic surface properties of the "activated alumina" of commerce maintained at a temperature between about 190 to 300° C., passing vapors of anhydrous aluminum chloride therethrough to adsorb a thin layer of aluminum chloride upon the surface of the adsorptive alumina, and maintaining the aluminum chloride vapors at a temperature above the vaporization point of the aluminum chloride.

9. A process for the production of improved combination aluminum chloride catalysts comprising the steps of providing a bed of pilled "Terrana" maintained at a temperature of 190 and 300° C., passing vapors of anhydrous aluminum chloride therethrough to adsorb a thin layer of aluminum chloride upon the surface of the pilled "Terrana," and maintaining the anhydrous aluminum chloride vapors at a temperature above the vaporization point of the aluminum chloride.

10. A process for the production of improved combination aluminum chloride catalysts comprising the steps of providing a bed of adsorptive catalyst carrier material maintained at a temperature between about 190 and 300° C., passing vapors of anhydrous aluminum chloride therethrough to adsorb a thin layer of aluminum chloride upon the surface of the adsorptive carrier, and maintaining the anhydrous aluminum chloride at a temperature above the vaporization point of the aluminum chloride.

11. In a process for the production of an aluminum chloride catalyst, the steps of preparing pills of an adsorptive clay, impregnating said pills with aluminum chloride vapors while maintaining the adsorptive clay pills and the aluminum chloride at a temperature above the vaporization point of the aluminum chloride, and regulating the conditions and time to adsorb from between 8 to 28% of aluminum chloride.

12. In a process for the production of an aluminum chloride catalyst by the impregnation of an adsorptive carrier material, the steps of impregnating the adsorptive carrier material with vapors of aluminum chloride while maintaining the carrier material and the aluminum chloride at a temperature above the vaporization point of the aluminum chloride and regulating the conditions and time to adsorb between 8 to 28% of aluminum chloride.

13. An improved combination aluminum chloride catalyst comprising pills of "Terrana" containing between 8 to 28% aluminum chloride, said aluminum chloride having been deposited upon the surface of the "Terrana" in a thin film by adsorption of aluminum chloride vapors while maintaining the aluminum chloride and the pills at a temperature above the vaporization point of the aluminum chloride during the adsorption step.

14. An improved combination aluminum chloride catalyst comprising an adsorptive alumina containing between 8 to 28% aluminum chloride, said aluminum chloride having been deposited upon the surface of the alumina in a thin film by adsorption of aluminum chloride vapors while maintaining the adsorptive alumina and the aluminum chloride above the vaporization point of the aluminum chloride during the adsorption step.

15. An improved combination aluminum chloride catalyst comprising an adsorptive mineral carrier material containing a small amount of firmly-bound water and containing between 8 to 28% of aluminum chloride, said aluminum chloride having been deposited upon the surface of the adsorptive carrier in a thin film by adsorption of aluminum chloride vapors while maintaining the aluminum chloride and the carrier at a temperature above the vaporization point of the aluminum chloride during the adsorption step.

16. An improved combination aluminum chloride catalyst comprising an adsorptive carrier containing between 8 to 28% aluminum chloride, said aluminum chloride having been deposited upon the surface of the adsorptive carrier in a thin film by adsorption of aluminum chloride vapors while maintaining the aluminum chloride and the carrier at a temperature above the vaporization point of the aluminum chloride during the adsorption step.

SAMUEL BENSON THOMAS.
FRANK M. McMILLAN.